Aug. 11, 1970

L. P. KAMM 3,523,656

TAPE CASSETTES

Filed May 6, 1968

INVENTOR
LAURANCE PETER KAMM
BY
Nolte & Nolte
ATTORNEYS

Aug. 11, 1970     L. P. KAMM     3,523,656
TAPE CASSETTES
Filed May 6, 1968     10 Sheets-Sheet 2
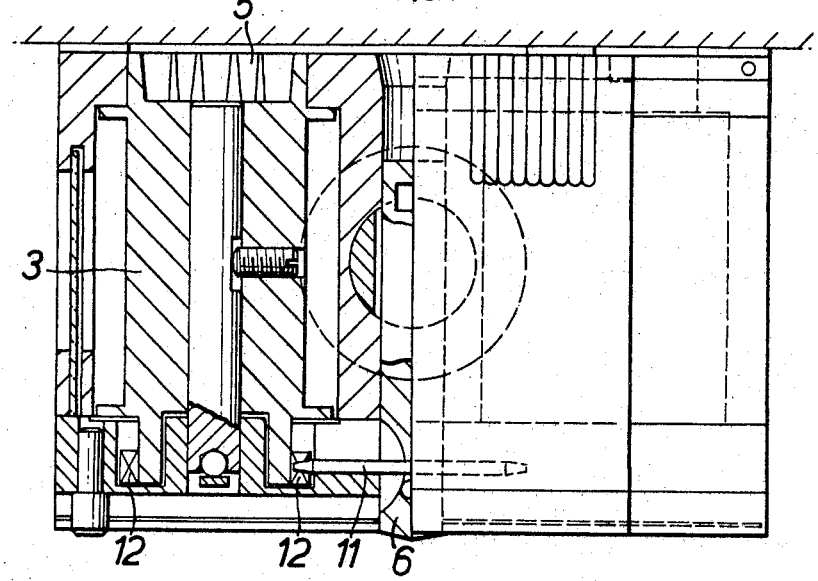
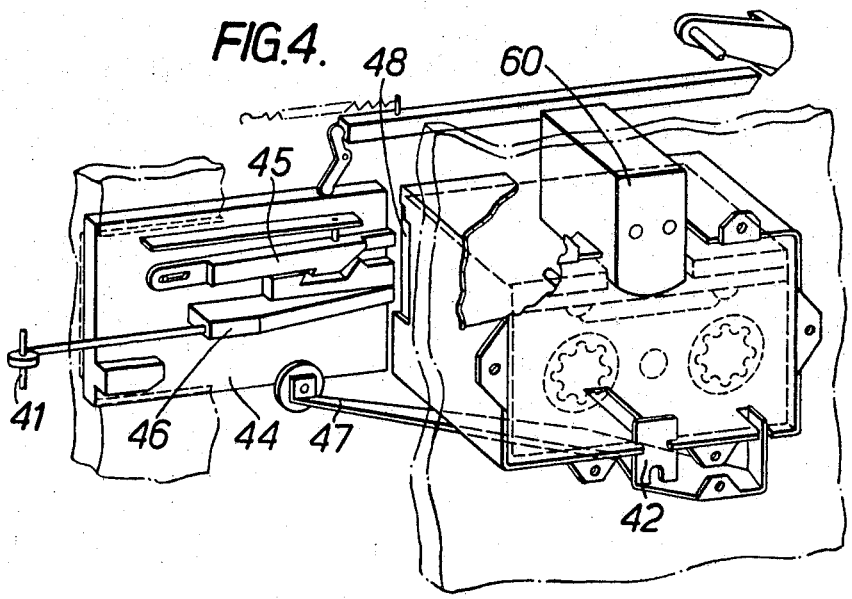
INVENTOR
LAURANCE PETER KAMM
BY
*Nolte & Nolte*
ATTORNEYS

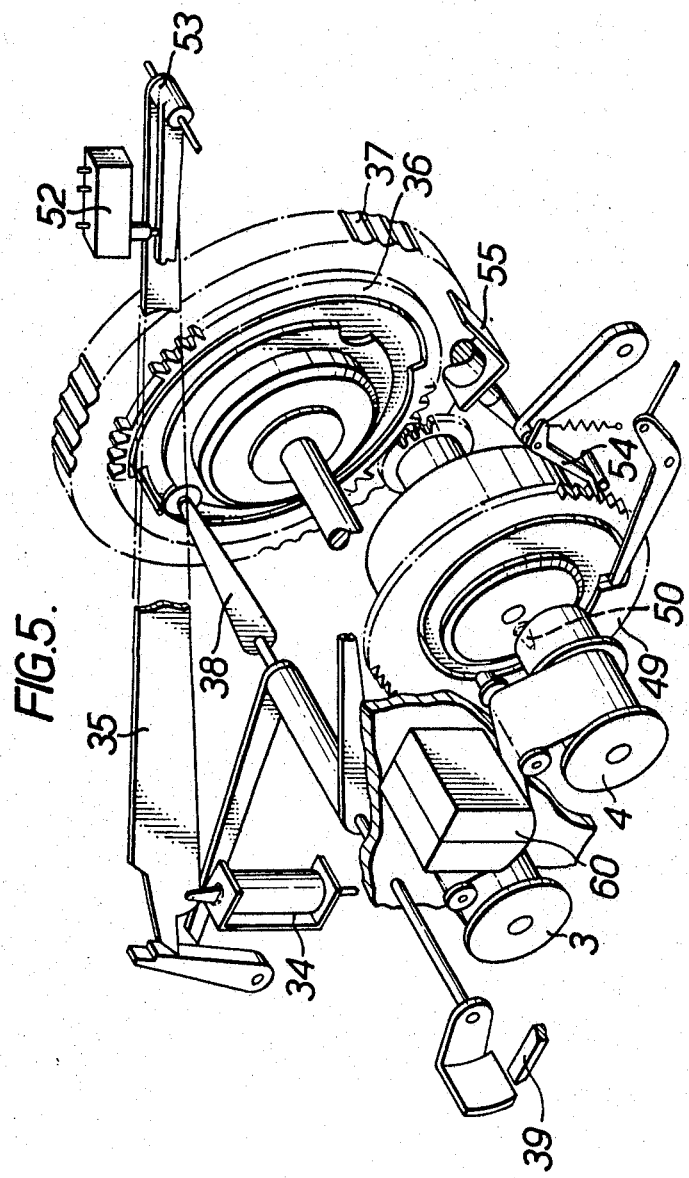

INVENTOR
LAURANCE PETER KAMM
BY
nolte & nolte
ATTORNEYS

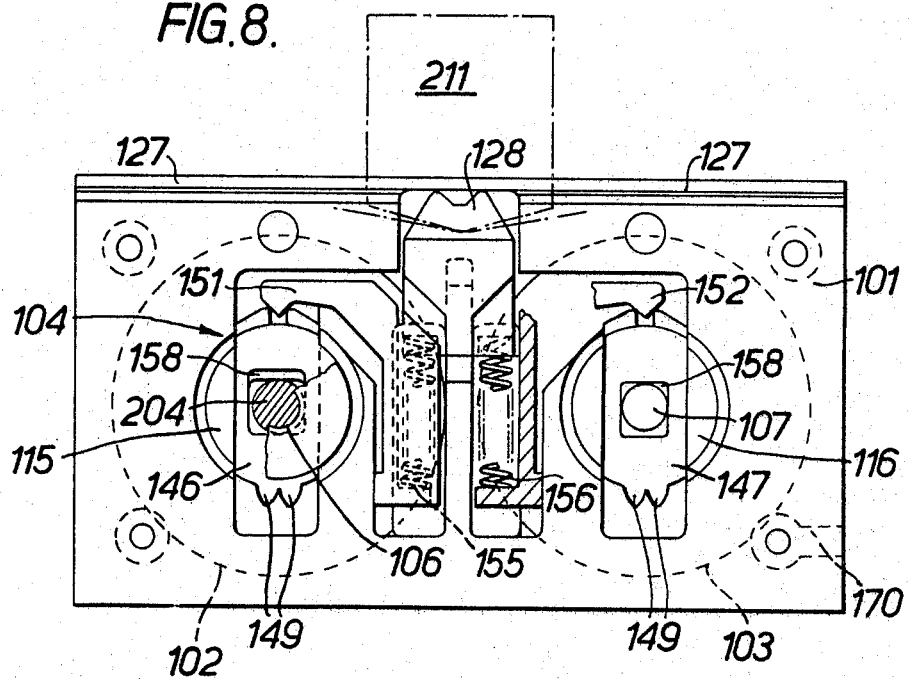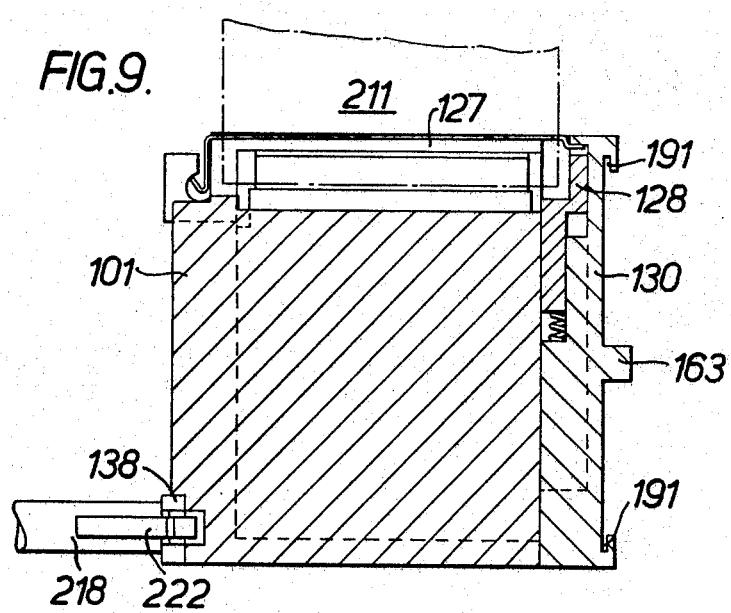

Aug. 11, 1970 — L. P. KAMM — 3,523,656

TAPE CASSETTES

Filed May 6, 1968 — 10 Sheets-Sheet 6

INVENTOR
LAURANCE PETER KAMM

BY

*Nolte & Nolte*
ATTORNEYS

United States Patent Office 3,523,656
Patented Aug. 11, 1970

3,523,656
TAPE CASSETTES
Laurance Peter Kamm, London, England, assignor to English Numbering Machines Limited, Enfield, Middlesex, England, a British company
Filed May 6, 1968, Ser. No. 726,735
Claims priority, application Great Britain, May 9, 1967, 21,396/67
Int. Cl. G03b 1/04; G11b 15/32, 23/04
U.S. Cl. 242—198                                7 Claims

ABSTRACT OF THE DISCLOSURE

The invention relates to cassettes for housing paper tape, magnetic tape, or film tape for use with recording and reading machines in which the cassette is provided with a locking device whereby spools of the cassette are retained in position when the cassette is not in use. The invention also relates to a mechanism for driving such cassettes and to the combination of such a cassette and the driving mechanism.

BACKGROUND OF THE INVENTION

This invention relates to cassettes and more specifically to cassettes for housing paper tape, magnetic tape or film tape for use in conjunction with recording heads of data recording machines.

SUMMARY OF THE INVENTION

It is the object of the invention to provide a tape cassette which can be inserted into a recording or reading machine and which is locked when not in use in the machine by a locking device which will retain the spools in position and thus prevent movement of the tape.

It is a further object of the invention to provide an operating arrangement for such a cassette.

It is a still further object of the invention to provide, in combination a cassette and an operating arrangement.

According to the invention there is provided a tape cassette, comprising a housing, two tape spools within the housing, each apertured to receive a shaft when the cassette is inserted in a cassette utilizing machine, means on each spool for coupling it to its associated shaft locating means on the housing for locating the cassette in the utilizing machine, and locking means carried by the housing for locking each spool automatically on withdrawal of the cassette from the machine.

Further according to the invention there is provided a cassette operating arrangement comprising receiving means for the cassette, drive shaft and an idler shaft for engaging in the centre apertures of the cassette spools, means for driving the drive shaft in steps, and a constant torque device on the idler shaft.

The invention also contemplates a cassette arrangement including a cassette as above described and mechanism for operating it comprising receiving means for the cassette, a drive shaft and idler shaft for engaging in the spool apertures, means for driving the drive shaft in steps and a constant torque device on the shaft.

BRIEF DESCRIPTION OF THE DRAWINGS

Two embodiments of the invention will be described by way of example with reference to the accompanying drawings in which:

FIG. 3 shows a section on the line III—III of FIG. 1;

FIG. 4 shows part of a recording machine including an enclosure with its door open and containing the cassette of FIGS. 1 to 3;

FIG. 5 is a partially exploded view of the mechanism of the machine of FIG. 4 for operating the cassette;

FIG. 8 is a front elevational view of the cassette of FIG. 6 with the front plate removed;

FIG. 9 is a sectional view taken on the line IX—IX of FIG. 6;

DESCRIPTION OF THE PREFERRED EMBODIMENTS

Figure 1:
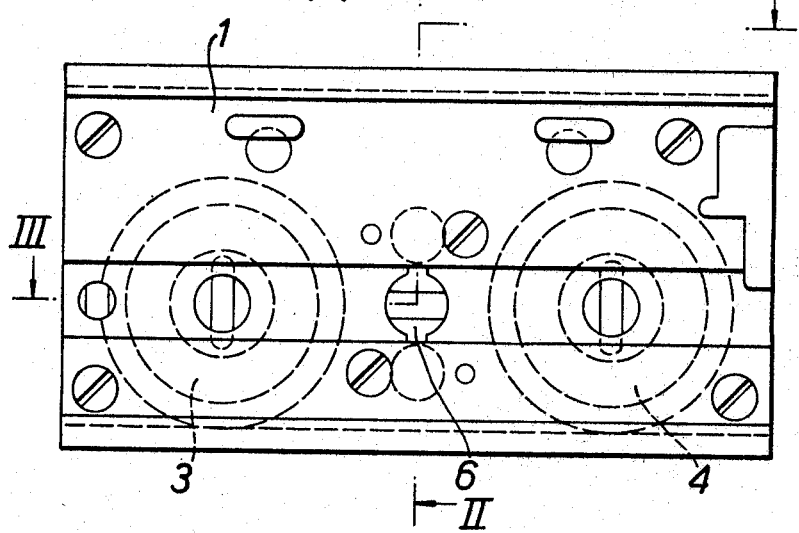
FIG. 1 is a general view of one form of cassette in accordance with the invention.
Figure 2:
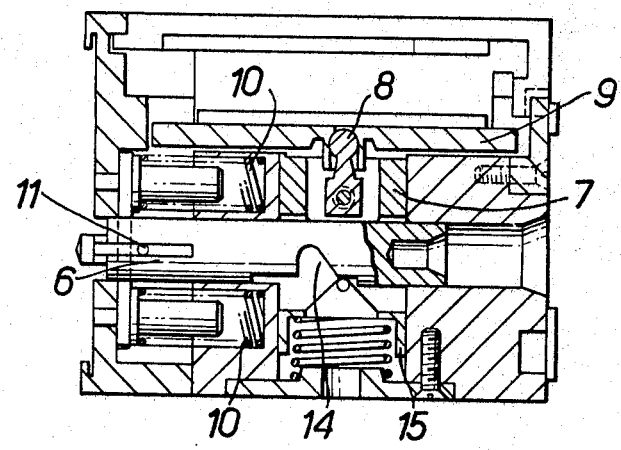
FIG. 2 shows a section on the line II—II of FIG. 1.
Figure 6:
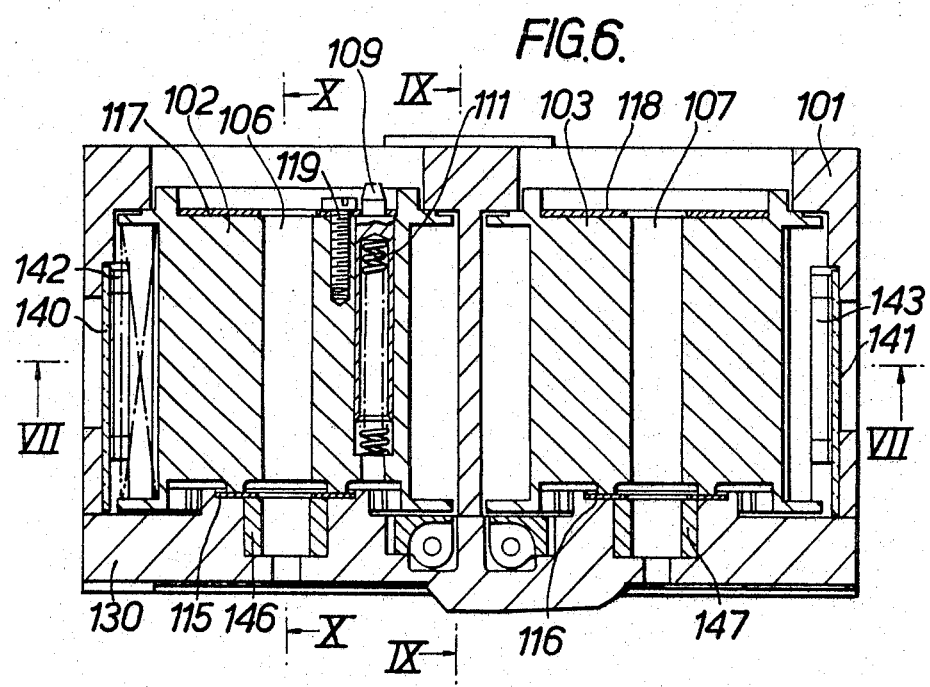
FIG. 6 is a sectional plan view of a second form of cassette in accordance with the invention.
Figure 7:
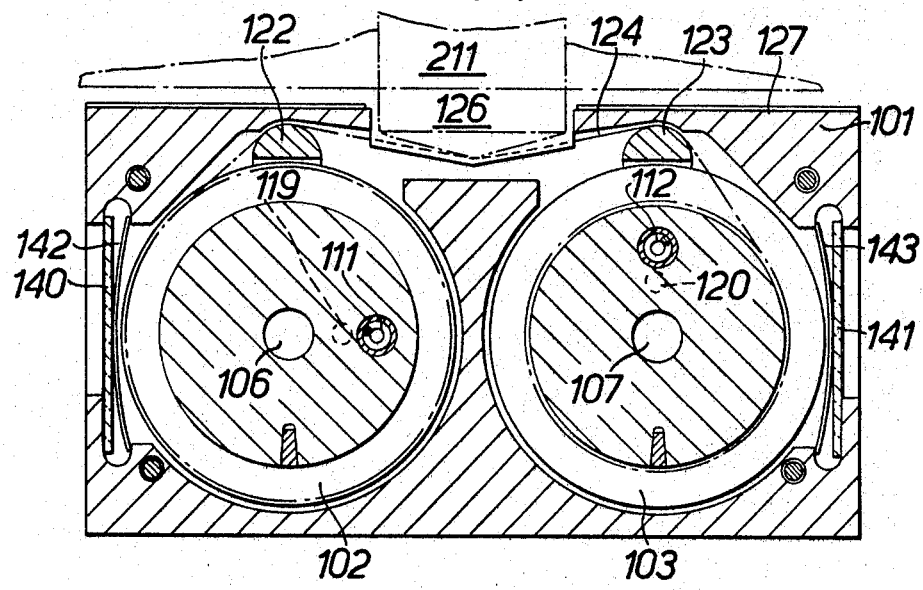
FIG. 7 is a sectional view taken on the line VII—VII of FIG. 6.

The cassette illustrated in FIGS. 1 to 3 comprises a housing or body part 1 containing two spools 3 and 4. The two spools each have internally cut gears 5 at one end which engage with driving pins 50 (FIG. 5) on a transport mechanism associated with a recording machine. An actuator plunger 6 is normally held in the non-operational position to the left as shown in FIG. 2 by springs 10. The actuator plunger 6 in this position bears against a sleeve 7 which is attached by a ball joint 8 to a felt pressure pad 9. The pressure pad is thus held in a lowered position and the tape is not held against the recording head 60 (FIGS. 4 and 5).

In this non-operational position, a cross pin 11 engages teeth 12 in a notched wheel formed at the end of each spool thus locking the spools in position. Thus, when the cassette is unloaded from the machine i.e. when the actuating member is in the non-operational position, the spools cannot be moved and the enclosed tape cannot be inadvertently moved. When the cassette is to be used a two piece cover (not shown) is opened and it is placed, for example, within an enclosure of a counter machine. The actuator plunger 6 is moved to the right by a cam 46 on the inside wall of the door 44 of the enclosure adjacent the cassette. A groove 14 in the actuator plunger 6 allows the sleeve 7 to rise under the action of a spring 16 acting on the lower part 15 of the sleeve and thus through the ball joint 8 the pressure pad 9 rises carrying with it the tape, the tape thus being firmly held against the recording head 60.

It is clear that when the door of the machine is opened the actuating member or plunger 6 will again move to the left under the action of the springs 10. To assist this movement the groove 14 in the actuating pin 6 has a cammed side surface which allows the bearing surface of the sleeve 7 to slide out of the groove 14 and bear against the outside surface of the plunger 6 once again. The sleeve 7 and the felt pressure pad 9 are again brought into the lower position and the tape is no longer held firmly against the recording head.

When used in conjunction with a counting machine, the cassette two piece cover is parted to expose the tape before the cassette is inserted into the enclosure of the machine. After insertion the door 44 is closed and locks the cassette in position by the pressure reaction from plunger 6, door cam 46 and lever 47. The door would, however, be prevented from closing by a pawl 45 if the cassette is inserted with the identification label 48 in place.

Upon turning thumb-wheel 37 a half turn to a detent position, the tape spool is advanced two revolutions by mutilated gear cam 36, meshing with an indexing gear 49.

This function proceeds both start and termination of tape "writing" thus providing sufficient spare tape for the acceleration and braking of the tape when the cassette is used in a reading unit.

The gear is disengaged at a half turned position when pawl 53 operates a microswitch 52 which initiates a signal to electronic circuitry (not shown). This is reset on the next half turn movement of the thumb-wheel. Also, a pawl 54 operated by stepping solenoid 55 automatically engages with the index wheel 49 attached to the tape spool. This pawl is operated with each key depression and thus feeds the tape.

For removing the cassette from the machine, a pulse from circuitry (not shown) energises solenoid 34 to lift locking arm 35 and free mutilated gear cam 36. Turning the thumb-wheel 37 through a half turn to the detent position drops the pawl 38 releasing the latch 39 and allowing door 44 to open under the influence of a spring 41 when the cassette is partially ejected under the action of spring pad 42.

Figure 13:
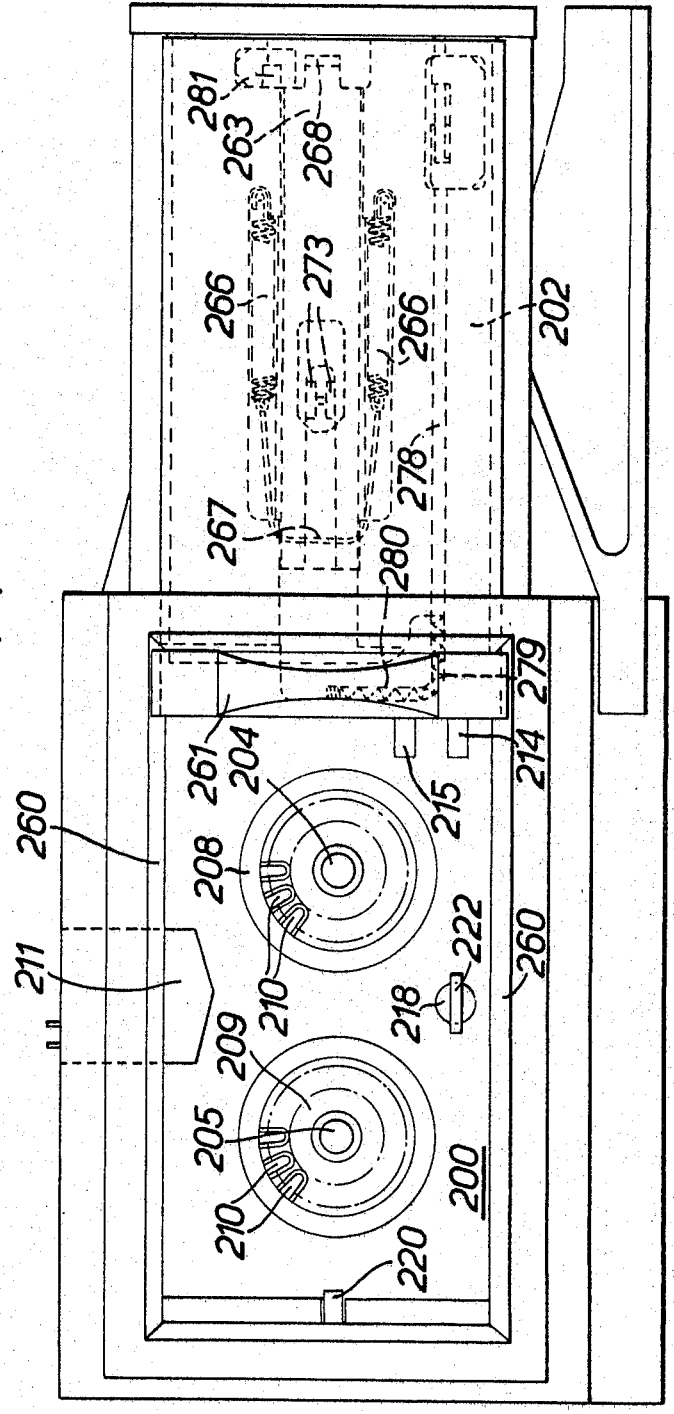
FIG. 13 is an elevational view taken in the direction of the arrow XIII of FIG. 12.

A second form of cassette is shown in FIGS. 6 to 11. This cassette comprises a body or housing 101 containing two spools 102 and 103 which are locked against rotation while the cassette is not in use by a locking device 104 which will be hereinafter described. Each spool 102, 103 is provided with a central bore 106, 107 for receipt of a respective driving shaft (shown in FIG. 8 at 204 and at 205 in FIG. 10) and with a pin 109, 110 urged out of the end flange of the spool by a spring 111, 112 for engagement with a drive wheel 208, 209 (FIG. 13). A thrust washer 115, 116 is provided for each spool together with a retaining flange 117, 118 attached to the spools by bolts 119, 120 for preventing total egress of the pins 109, 110.

Tape guides 122 and 123 are provided for guiding the tape 124 past the magnetic head position 126. An opening for admission of the head is covered by a pair of sliding covers 127, controlled by a sliding lug 128, slidably engageable at one edge in a slot 129 of the cassette face plate 130 and at the other edge in a slot 131 in extensions 132 of the tape guides 122 and 123. These extensions 132 extend beyond the rear or locating face 134 of the cassette and form two points of a three point location. The third location point is provided by a slot 136 of an ejector arrangement (into which slot an ejector pin 218 fits) in conjunction with a protruding cover plate 138.

The cassette is provided in its side faces with windows 140 and 141 held in place by springs 142 and 143, by means of which windows the tape can be viewed for any significant markings such as might for example, indicate the beginning or end of the tape.

Figure 10:
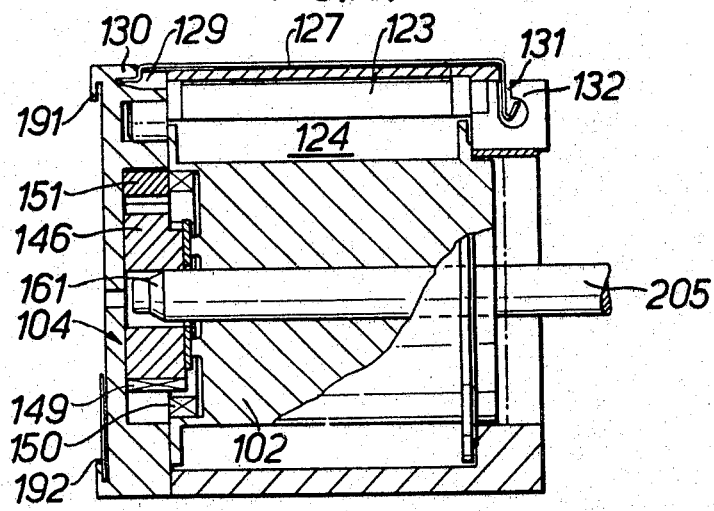
FIG. 10 is a sectional view taken on line X—X of FIG. 6.
Figure 11:
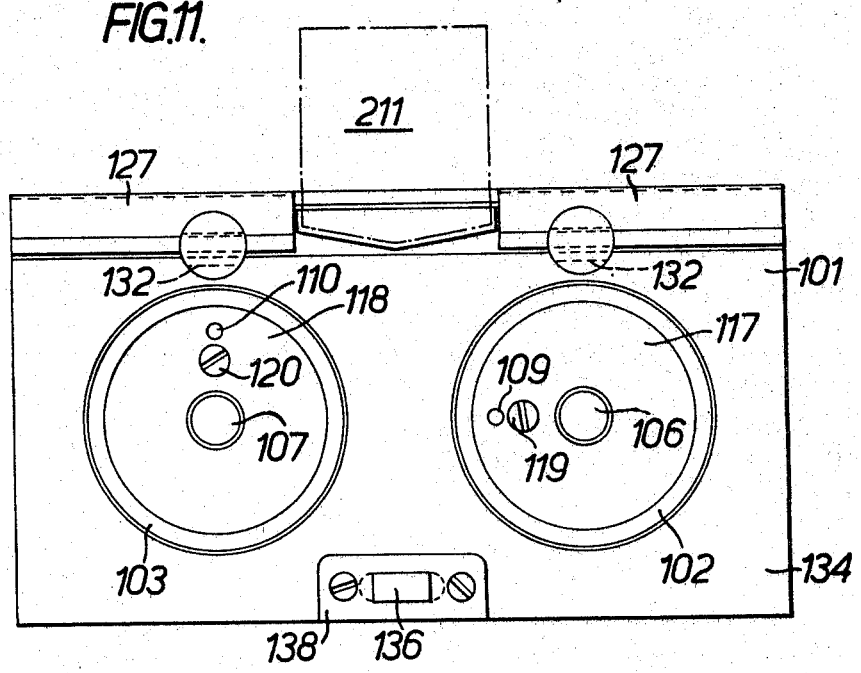
FIG. 11 is a back elevational view of the cassette of FIG. 6.

The locking device 104 for the spools (see FIGS. 8 and 10) comprises a pair of locking slides 146 and 147 (movable vertically in the figures) and having two teeth 149 engageable with teeth 150 on the spools 102 and 103 (FIG. 10). The slides 146, 147 are urged downwardly to their engaged position by pressure arms 151 and 152 biased downwardly by springs 155 and 156 so as to retain the slides in their locking condition. Each slide has a square aperture 158, which in its locking position is offset downwardly from the axis of the spools 102 and 103. When the driving shafts 204, 205 enters through the spools, their bevelled ends 161 enter the apertures 158 and raise the slides 146 and 147 to release the spools.

The face plate 130 of the cassette is provided with a cam projection 163 for cooperating with a mechanism door as will be described. It is also provided with slots 191 to accommodate a label 192 indicating that the cassette has been used. A slot is provided for use by the mechanism in indicating the presence or absence of the label, as will hereinafter be described, the position of the slot being indicated by a dotted line in FIG. 8 but being in fact situated in the face plate 130.

A suitable mechanism for use with the cassette shown in FIGS. 6 to 11 is shown in FIGS. 12 to 16. This mechanism comprises a cassette receptacle 200 whose entrance 201 is closed by a sliding door 202. Two shafts 204 and 205 extend into the cassette receptacle 200, the shaft 204 being a driving shaft and the shaft 205 being an idler shaft acted upon by a tensioning spring mechanism 206 as will be described. Each shaft 204, 205 is provided with a coupling wheel 208, 209 having a plurality of U-shaped slots 210 therearound to receive the pins 109, 110 of the cassette spools. Also extending into the cassette receptacle 200 is a tape recording head 211 for engagement with the tape 124 in the tape head position 126 of the cassette. Two feelers 214 and 215 of two microswitches indicated at 216 and mounted one above the other sense respectively that a cassette is in the receptacle 200 or that no cassette is present. A feeler 219 is also provided, pivoted at 220, to sense that the door 202 is shut and also that no label is present on the front face of the cassette. This feeler 219 is associated with a microswitch 221. An ejector pin 218 protrudes into the receptacle 200 for engagement in the aperture 136 of the cover plate 138. It is provided with spring hooks 222 projecting radially therefrom which engage the edges of the cover plate 138 to releasably retain the cassette thereon.

The drive shaft 204 is driven by a worm gear 224 meshing with a worm 225 on the shaft 226 of a stepping motor 227. Running freely on the shaft 204 is one spool 229 of the tensioning spring assembly 206, the other spool 230 of which is splined to the idler shaft 205. On drive of the motor 227, the spring 231 is pulled off the spool 229 on to the spool 230 by rotation of the feed spool 102 of the cassette and thus maintains this spool 102 at constant tension. This tensioning spring device 206 is often known as a tensator.

Figure 14:
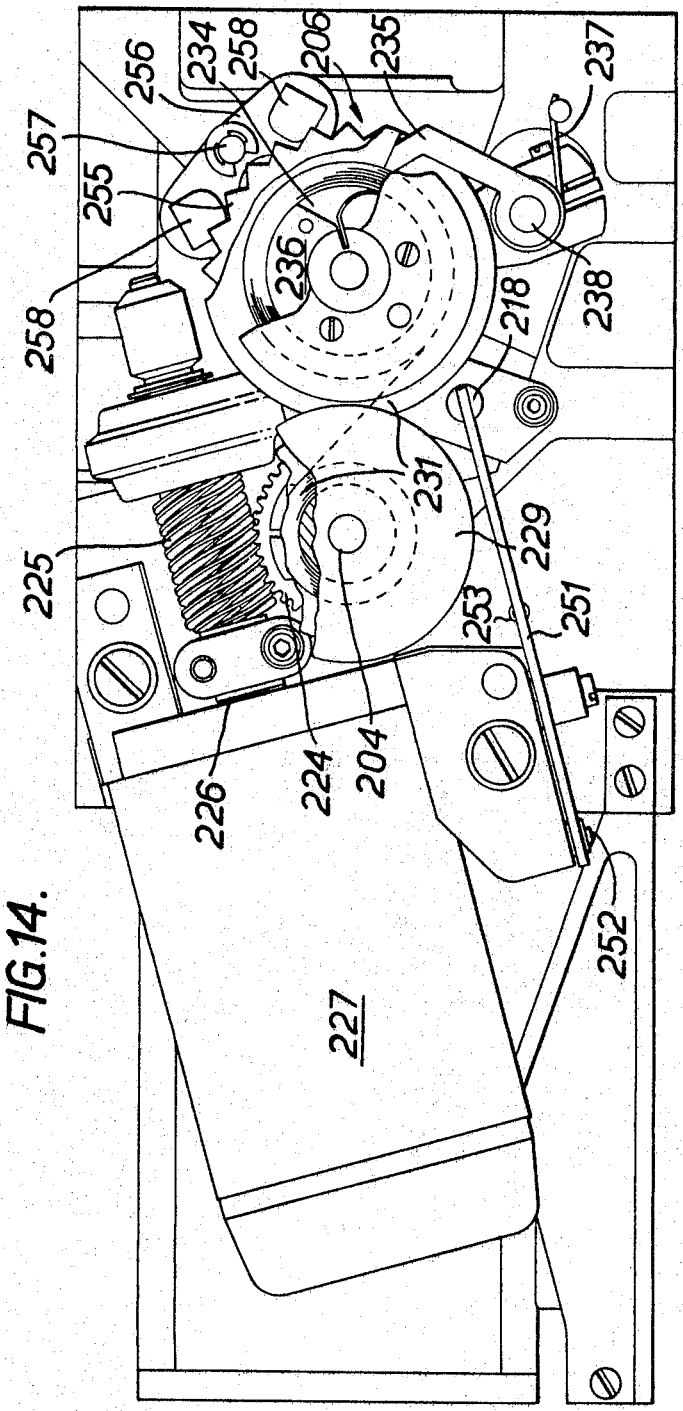
FIG. 14 is an elevational view taken in the direction of the arrow XIV of FIG. 12.
Figure 15:
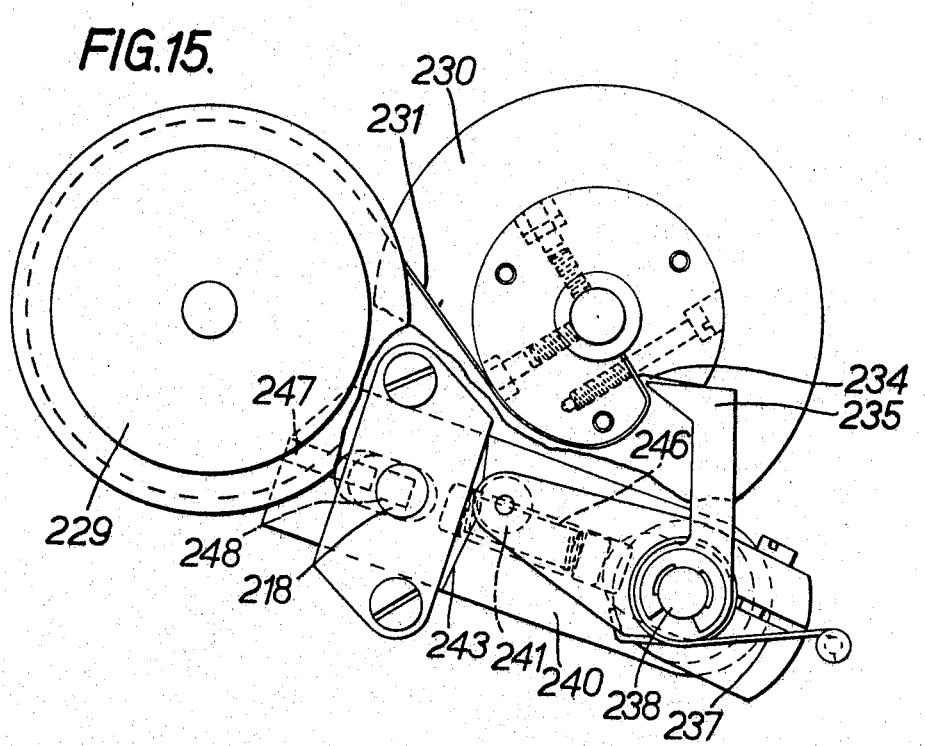
FIG. 15 is an elevational view of the tensioning spring device shown in FIGS. 12 and 14.
Figure 16:
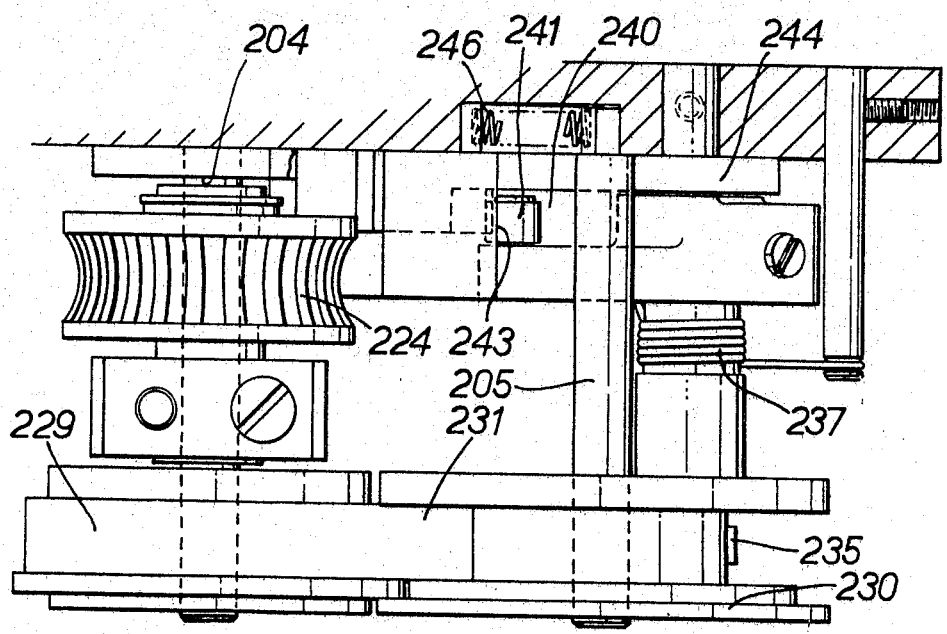
FIG. 16 is a plan view of the arrangement shown in FIG. 15.

Referring now particularly to FIGS. 15 and 16, it will be seen that the spool 230 has a recess 234 therein at the point of attachment of the spring 231 to receive a pawl 235. This pawl 235 is spring urged against the hub 236 of the spool 230 by means of a coil spring 237, the pawl being pivotable about a rod 238. When the spool 230 is empty the pawl 235 engages in the recess 234 to prevent overwinding of the spring 231 but, as the spool 230 winds on the spring 231, the pawl 235 rides on the spring as shown in FIG. 14. Connected to the pawl 235 for movement therewith about the rod 238 is a lever 240 carrying a roller 241 at its free end. This roller is engageable with the raised edge 243 of a sliding locking key lever 244 slidable longitudinally and supported in slots 245 and 246A by the ejector pin 218 and by the rod 238 respectively. Sliding movement of the locking key lever 244 is effectively prevented by the engagement of the roller 241 with the raised edge 243 in the position shown in FIGS. 15 and 16, but pivotal movement of the pawl 235 about the rod 238 in response to the winding on of the spring 231 by the spool 230 will move the roller 241 upwards (FIG. 15) and out of contact with the edge 243. The locking key lever 244 is biassed to the right (FIGS. 15 and 16) by a compression spring 246 and carries a locking pin 247 engageable in a slot 248 in the ejector pin 218 when in a partial eject position. The ejector pin 218 is biassed, by a lever 251 pivoted at 252 and attached to a spring at 253, to the eject position (FIG. 14). On return of the self returning spring 231 from the spool 230 to the spool 229, energy is absorbed by an escapement consisting of a toothed wheel 255 mounted for rotation with the spool 230 and cooperating with a rocking lever 256 pivoted at 257 and carrying pellets 258.

As previously mentioned, the cassette receptacle 200 is provided with a sliding door 202. This door 202 slides in guides 260 and is operated by a handle 261. On its rear face, the door 202 carries a slide 263 running in guides, not shown, and biased to the right (FIG. 13) by a pair of springs 266 acting on the slide 263 at 267. The slide runs on rollers or ball bearings (not shown) and has at its rightward end an inclined portion 268 which cooperates, when the door is closed, with a roller 270 on a bell crank lever 271 biased in a direction to bring the roller against the door by a spring 272. The lever 271 is also provided with an operating catch member 275 engageable by the edge of the door when opening to push the roller 270 away from the door. The slide 263 carries a pair of rollers 273 which, when the door 202 is closed ride up the cam member 163 on the cassette. The rollers 273 are urged outwardly by a leaf spring 274 and thus pushes the cassette firmly home in the receptacle 200. The door is also provided with a tongue 277 engageable in the slot 170 in the cassette (FIG. 8) to detect the presence of a label thereon. If a label is present, the tongue 277 cannot enter the slot 170 and will remain stationary on closing of the door 202. A rod 278 attached to the tongue 277 will also remain stationary and will cause a spring 279 to move downwardly in a channel 280. This spring 279, used to enable it to negotiate the bend in the channel 280, will be moved out of the way of the feeler 220 and the microswitch 221 will not be operated. A door latch is provided to hold the door in its closed position. It comprises a projection 281 engageable by the armature (not shown) of an electromagnet 282 such that when the electromagnet 282 is energised, the door is unlocked.

The operation of the mechanism of FIGS. 12 to 16 will now be described:

With the door 202 opens the cassette is inserted with its face 134 foremost into the receptacle 200 until it engages the ejector pin 218 which enters the aperture 136 in the cassette. Further inward motion of the cassette will push back the ejector pin 218 against the force of the spring 253 and the locating means 132 and 138 will engage the back surface of the receptacle. In this position, the pins 109 in the two tape spools 102 and 103 may engage in the slots 210, but if they do not, they will engage on first movement of the shaft 204 and the spool 102. At this time also, the shafts 204 and 205 have entered the apertures 106 and 107 in the tape spools and raised the locking slides 146 and 147 to unlock the spools.

With the cassette held in, the feelers 214 and 215 sense the presence of the cassette. The door is then closed by sliding it to the left. This movement of the door in shutting causes the rollers 273 to ride up the cam member 163 and hold the cassette firmly in place, the roller 270 to drop behind the incline 268 of the slide 263 and the tongue 277 to enter the slot 170 in the cassette. This allows the rod 278 to move with the door and leaves the spring 279 protruding from the end of the channel 280. This protruding end engages the feeler 220 indicating that the door is closed and that no label is present on the front face of the cassette. In the event of a label being present (indicating that the tape has been used) the label will halt the movement of the tongue 277 with the sliding door 202 and withdraw the protruding portion of the spring 279 into the channel 280, thus failing to actuate the microswitch 221.

The electromagnet 282 is then de-energized and the door is locked. The machine is now ready for recording. The tape is driven stepwise by the motor 227 through the worm 225, worm gear 224 and drive shaft 204. This movement of the shaft 204 is transmitted via the tape to the shaft 205 and causes the spring 231 to be wound from the spool 229 to the spool 230 under the constant tension provided by the spring, thus providing constant tension in the tape and ensuring its correct engagement with the recording head 211.

Once recording is finished the motor 227 is stopped. The pawl 235 will have ridden upon the spring 231 to move the roller 241 out of engagement with the raised edge 243 of the locking key lever 244 allowing it to move to the right (FIG. 15) under the action of the compression spring 246 until the pin 247 engages the ejector pin 218 ready for entrance into the slot 248. The electromagnet 282 is then energised to release the door lock.

Figure 12:
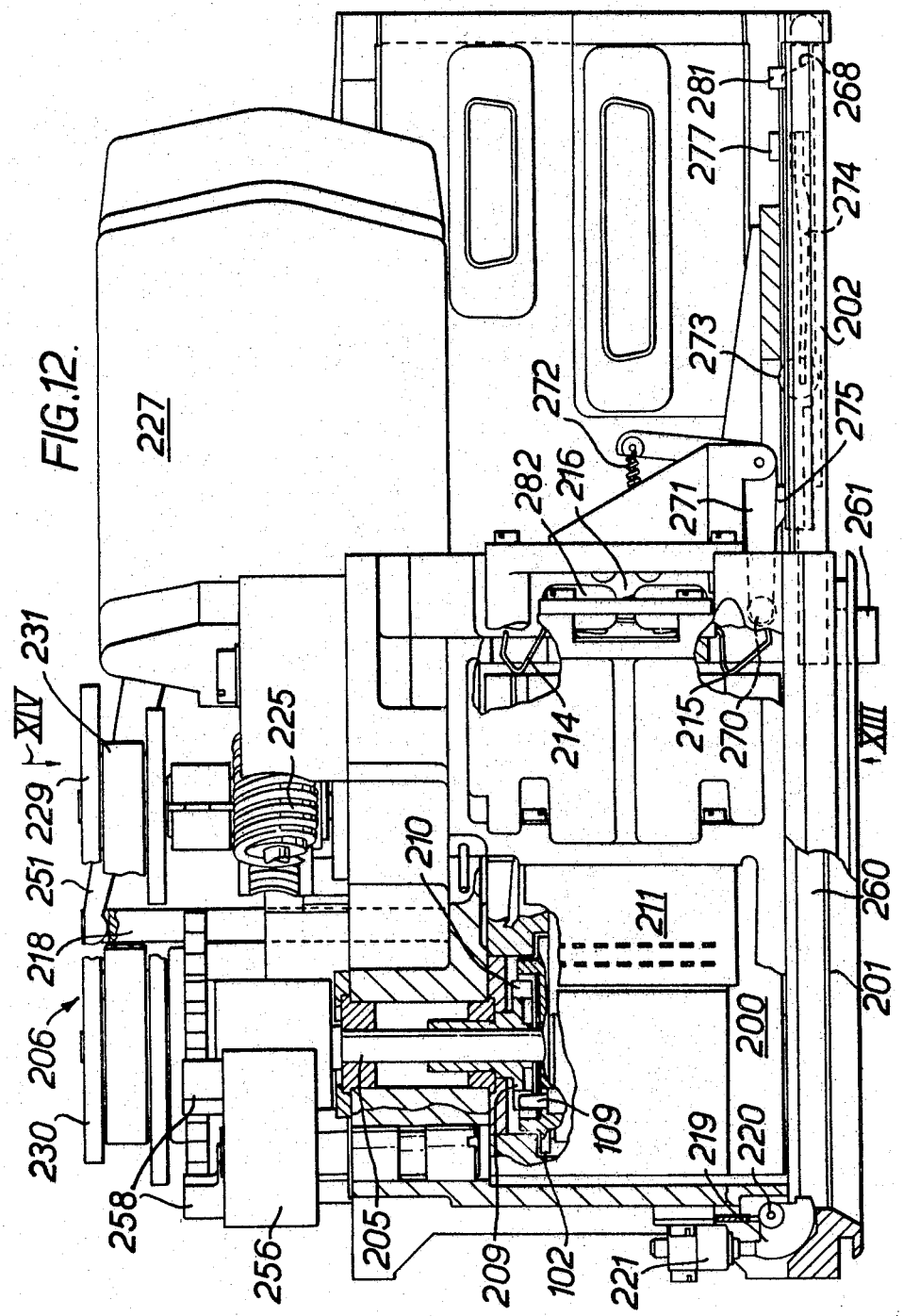
FIG. 12 is a plan view partly broken away of a mechanism utilizing the cassette of FIG. 6.

The door 202 is then slid to the right (FIGS. 12 and 13). The roller 270, being in engagement with the inclined surface 268 of the slide 263, holds the slide 263 stationary and thus tensions the springs 266. The spring 279 disengages from the feeler 220 releasing the microswitch 221. Further rightward movement of the door causes the edge of the door to engage the catch member 275 to push the roller 270 away from the door and thus free the slide 263. This slide 263 thus moves extremely rapidly to the right under the action of tensioned springs 266 to clear the rollers 273 from the cam member 163 and allow partial ejection of the cassette by the ejection pin 218. This partial ejection will disengage the spools 102 and 103 from the drive wheels 209 and 210 and, by this forward motion, withdrawing the shafts 204 and 205 sufficiently to let the locking slides 146 and 147 drop under the action of the springs 155 and 156 to lock the spools 102 and 103. At the same time, the pin 247 has entered the slot 248 in the ejector pin 218 under the action of the spring 246 so as to lock the ejector pin in the partial ejection position.

As soon as the driving connection between the wheel 209 and the spool 102 has been released, the spring 231 will return automatically from the spool 230 to the spool 229. In order to prevent energy build up on this return movement of the spring 131, the escapement 255, 256 acts to absorb energy. As the return movement of the spring 231 comes to an end, the pawl 235 will again move into the recess 234 to prevent over rewinding of the spring and the roller 241 will return into engagement with the raised edge 243 and force the locking pin 247 out of the slot 248 to free the ejector pin 218. In this way it is ensured that no cassette can be inserted while the shaft 205 is running in reverse.

During this return of the spring 231, the door is fully opened and the cassette will be further ejected by the ejector pin 218 and may then be withdrawn from the ejector pin 218 by overcoming the spring tension of the hook members 222.

A fresh cassette can then be inserted in the receptacle 200 and the operation repeated.

It will be appreciated that the above described embodiments are given by way of example only and that various modifications may be made to the above described embodiments without departing from the scope and spirit of the invention.

I claim:

1. A tape cassette, comprising a housing, two tape spools within said housing, each spool apertured to receive a shaft when said cassette is inserted in a cassette utilising machine, means on each spool for coupling it to its associated shaft, locating means on said housing for locating the cassette in said utilising machine, locking means carried by said housing for locking each said spool automatically on withdrawal of said cassette from said machine, said locking means comprising a wheel provided at one end of each spool and teeth provided on each wheel, a locking member comprising a cross-pin which is engageable with said teeth and which is spring urged into engagement with said teeth and said housing being provided with an actuating member carrying said cross-pin, said actuating member and said teeth being so arranged that engagement takes place when said cassette is withdrawn from said utilising machine.

2. A tape cassette, comprising a housing, two tape spools within said housing, each spool apertured to receive a shaft when said cassette is inserted in a cassette utilising machine, means on each spool for coupling it to its associated shaft, locating means on said housing for locating the cassette in said utilising machine, and locking means carried by said housing for locking each said spool automatically on withdrawal of said cassette from said machine, said locking means comprising a ring provided at one end of each said spool and teeth provided internally on each ring, a separate locking member engageable the teeth of each spool and spring urged into engagement with said teeth, said locking members being slidable radially with respect to the axes of their associated spools into and out of engagement with said teeth, said locking members and said teeth being so arranged that engagement takes place when said cassette is withdrawn from said utilising machine.

3. A cassette operating arrangement comprising receiving means for the cassette, a drive shaft and an idler shaft for engaging in centre apertures in the cassette spools, means for driving the drive shaft in steps, and a constant torque device on said idler shaft comprising a feed spool, a take up spool, a spring movable from said feed spool to said take-up spool, means for mounting said feed spool freely on said drive shaft and means for mounting said take-up spool for rotation with said idler shaft.

4. A cassette as defined in claim 2, wherein said locking members are engageable by said shafts when received by said spool apertures in such a way that said locking members are moved radially away from said toothed rings to release said spools.

5. A cassette comprising a housing, two tape spools within said housing each apertured to receive a shaft when said cassette is inserted in a cassette utilising machine, a spring urged driving pin in each said spool for engagement with a slotted wheel attached to its associated shaft for rotation therewith, locating means on said housing for locating the cassette in said utilising machine, an internally toothed ring provided at one end of each said spool, a locking member for each said spool, said locking members being slidable radially with respect to the axes of their associated spools into and out of engagement with the teeth of said toothed rings, each said locking member having an aperture to engage camming ends of said shafts so as to move said locking members radially away from said toothed rings on receipt by said spools of said shafts, springs means for radially moving said locking members into engagement with said toothed ring on removal of said shafts, tape guides for maintaining a tape portion between said spools in an operative position, means for attachment of a label to the cassette and at least one window in said housing for viewing the tape therethrough.

6. In combination:
(A) a cassette comprising a housing, two tape spools within said housing each apertured along its axis, a spring urged driving pin in each said spool, locating means on said housing, an internally toothed ring provided at one end of each said spool, a locking member for each said spool, said locking members being slidable radially with respect the axes of their associated spools into and out of engagement with the teeth of said toothed rings, each said locking member having an aperture therein, spring means for biassing said locking members to their engaged position, tape guides for maintaining a tape portion between said spools in an operative position, an ejector slot in said housing, means for the attachment of a label to said housing and at least one window in said housing for viewing the tape therethrough; and (B) a cassette operating arrangement comprising a receptacle for receiving said cassette, a drive shaft and an idler shaft for engagement in the apertures of said cassette spools, camming ends on said shafts for engagement in the apertures in said locking members so as to move them radially away from said teeth in said internally toothed ring, slotted wheels fixedly mounted on said shafts for receiving said spring urged driving pins, means for driving said driving shaft in steps, a tensioning spring device comprising a feed spool, a take up spool, a spring movable from said feed spool to said take up spool so as to provide constant tension on said take up spool, means for mounting said take up spool freely on said drive shaft and means for mounting said take up spool for rotation with said idler shaft, an escapement mechanism for absorbing the energy generated by said tensioning spring during return of said tensioning spring from said take up spool to said feed spool, an ejector mechanism for ejecting said cassette, said ejector mechanism including a spring urged ejector pin engageable in said ejection slot in said cassette housing, means for locking said ejector mechanism, means associated with said tensioning spring device for controlling operation of said ejector locking means so as to cause locking of said ejector mechanism in the ejected position during said return of said tensioning spring to prevent insertion of said cassette, a door for closing said receptacle means for preventing operation of the arrangement when said door is open, means on said door for urging said cassette to its operative position in which said cassette spools are coupled to said shafts and means on said door for permitting sufficient ejection to disengage said cassette only when said door has reached a predetermined partly open position.

7. A cassette operating arrangement comprising a receptacle for receiving the cassette, a drive shaft and an idler shaft for engaging in centre apertures of the spools of said cassette, means for driving said drive shaft in steps, a tensioning spring device comprising a feed spool, a take up spool, a spring movable from said feed spool to said take up spool so as to provide constant tension on said take up spool, means for mounting said feed spool freely on said drive shaft and means for mounting said take up spool for rotation with said idler shaft, an escapement mechanism for absorbing the energy generated by said spring during return of said spring from said take up spool to said feed spool, an ejector mechanism for ejecting said cassette, said ejector mechanism including a spring urged pin engageable in an ejection slot in said cassette, means for locking said ejector mechanism, means associated with said tensioning spring device for controlling operation of said ejector locking means so as cause locking of said ejector mechanism in the ejected position during return of the said tensioning spring to prevent insertion of a cassette, a door for closing said receptacle means for preventing operation of the arrangement when said door is open, means on said door for urging a cassette inserted into said receptacle to its operative position in which said cassette spools are coupled to said drive and idler shafts, and means on said door for permitting sufficient ejection to disengage said cassette only when said door has reached a predetermined partly opened position.

References Cited

UNITED STATES PATENTS

| | | | |
|---|---|---|---|
| 3,059,871 | 10/1962 | Loewe | 242—55.13 |
| 3,066,880 | 12/1962 | Bauer | 242—55.13 |
| 3,111,282 | 11/1963 | Proctor | 242—55.13 |
| 3,294,332 | 12/1966 | Miville et al. | 242—55.12 |
| 3,272,325 | 9/1966 | Schoenmakers | 206—52 |

LEONARD D. CHRISTIAN, Primary Examiner

U.S. Cl. X.R.

206—52